Feb. 5, 1929.
W. T. WRIGHT
1,701,434
STABILIZER FOR STEERING WHEELS
Filed June 24, 1926
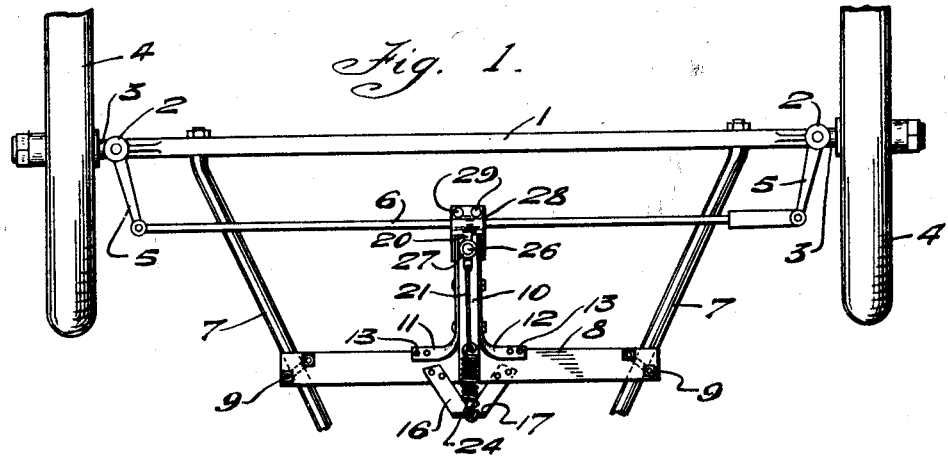
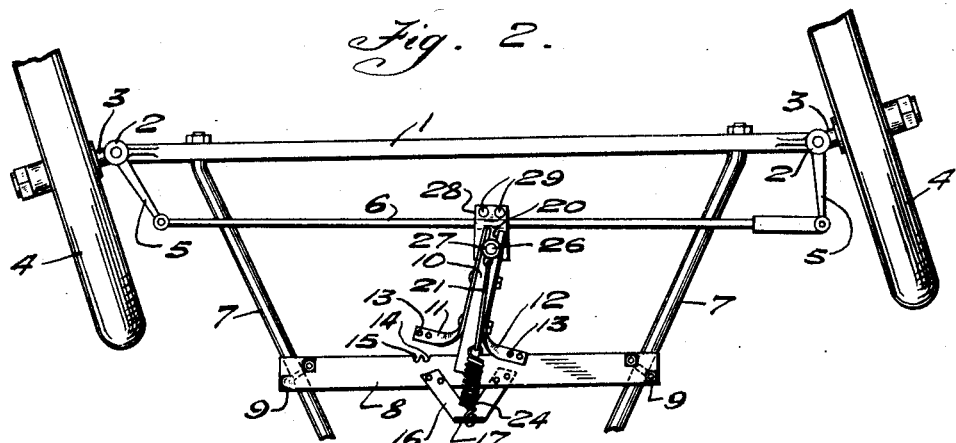
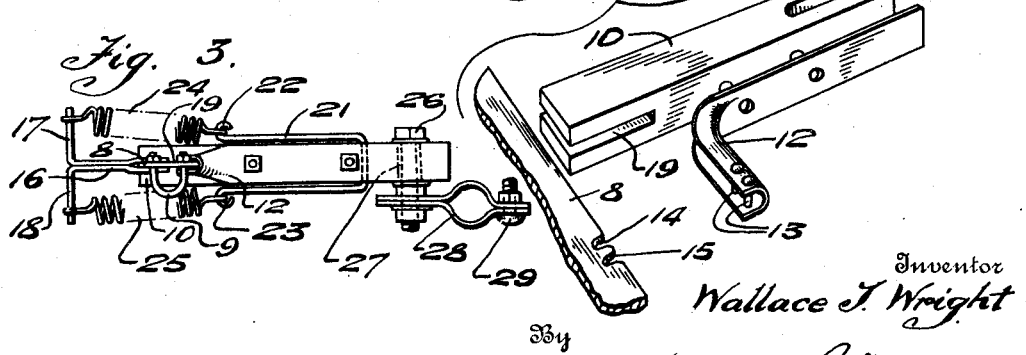
Inventor
Wallace T. Wright
By
Attorney Patented Feb. 5, 1929.

1,701,434

UNITED STATES PATENT OFFICE.

WALLACE T. WRIGHT, OF QUINCY, ILLINOIS.

STABILIZER FOR STEERING WHEELS.

Application filed June 24, 1926. Serial No. 118,332.

This invention relates to stabilizers for the steering wheels of auto vehicles, and, in common with other known equalizing devices for steering wheels, it has for its principal object the automatic centering of the steering mechanism so that the steering wheels are normally maintained parallel with the direction of movement of the auto vehicle, irrespective of their tendency to turn in response to road inequalities.

Another object of the invention, and in this it distinguishes from known devices, is to provide stabilizing means which, while holding the steering wheels positively to a straight course, yields without increasing the resistance of the stabilizing device when the steering wheels are turned to steer around a curve, differing in this respect from known devices in which steering around a curve is made difficult by the increasing pull of the stabilizing means.

Other objects of the invention relate to the novel and improved construction of stabilizing mechanism described in the following specification and particularly pointed out in the appended claims.

In the drawings, in the several figures of which the same reference characters are used to denote identical parts, Figure 1 is a plan view of a portion of the front part of the chassis of an automobile to which the device of my invention is applied, the parts being shown with the steering wheels directed straight ahead.

Figure 2 is a similar view showing the steering wheels inclined as in turning a curve.

Figure 3 is a side elevation of the stabilizing devices.

Figure 4 is a disassembled view in perspective showing several parts of the stabilizing device.

Referring now in detail to the several figures, the numeral 1 represents the front axle of an auto vehicle having at its ends the usual spindle forks 2, spindles 3 on which the steering wheels 4 are mounted, and spindle arms 5. The steering arms are connected by the connecting rod 6, one end of said connecting rod being operatively associated with means, not shown, extending to the steering wheel.

In the type of automobile shown in the drawings a pair of radius rods 7 are joined to the front axle on opposite sides of the middle thereof, the convergent ends of said radius rods terminating in a single fitting, not shown, cooperating with supporting means, also not shown, secured to the crank case of the engine of the auto vehicle.

So much of the description as has been given relates to the construction of a popular type of automobile and per se, forms no part of the present invention.

The stabilizer comprises a supporting plate 8 arranged transversely of the chassis and being of sufficient length to rest upon the radius rods. In those types of automobiles in which there are no radius rods said plate may be made sufficiently long to reach from one side to the other of the frame. In the present instance the plate 8 is shown as secured to the radius rods by means of the U-bolts 9. A T-shaped member rests against the forward edge of the plate 8, said member including a longitudinal lever 10 and transverse arms 11 and 12, preferably channel shaped, said arms being secured in any suitable manner to opposite sides of the lever 10 and forming a base therefor. The arms 11 and 12 are provided with pins 13 arranged at equal distances from the lever 10 on both sides, said pins being normally seated in notches 14 and 15 formed in the plate 8 with the channels of the arms 11 and 12 straddling an edge of said plate. The plate 8 is provided with a spring hanger 16 having lugs 17 and 18 extending respectively above and below the median horizontal plane of the stabilizing device. The lever 10 is provided at its rearward end with a horizontal slot 19, the top and bottom walls of which are adapted to straddle the plate 8 at a point adjacent its center to act as a guide for the arms 11 and 12. The forward end of the lever 10 is formed with a vertical slot 20. A loop 21 passes through the slot 20 resting against the end wall thereof, the opposite ends of said loop extending longitudinally above and below the lever 10 and being preferably formed with hooks 22 and 23. Spiral springs 24 and 25 are arranged one above and one below the median horizontal plane of the stabilizing device, said springs being supported in tensioned condition between the lugs 17 and 18 of the spring hanger 16 and the hooks 22 and 23 of the springs 24 and 25.

From what has thus far been disclosed it will be understood that the springs maintain the channelled arms 11 and 12 pressed firmly against the edge of the plate 8, the lever 10 being thereby supported in perpendicular relation to said plate.

A vertically disposed pin 26 is located in this slot 20, said pin being surrounded by an anti-friction roller 27 working against the walls of said slot. A clamp 28, is secured in suitable manner to said pin and embraces the connecting rod 6, being clamped thereto by suitable means such as the bolt and nut 29.

To install the stabilizer, the steering wheels of the auto vehicle are arranged parallel to the direction of movement of said vehicle, and the clamp 28 is then secured to the connecting rod 6 midway between the ends of the latter. While the auto vehicle is running straight, any tendency of the steering wheels to deviate from a straight course causes the clamp 28 with the pin 26 to move in a lateral direction and the pin 26 to bear against the side walls of the slot 20, thus tending to oscillate the lever 10. Such oscillatory movement is resisted by the springs 24 and 25, the lever 10 reacting through the walls of the slot 20 against the pin 26, holding the connecting rod 6 stationary and inhibiting any "shimmying" or deviatory movement of the steering wheels.

Whenever the steering wheel of the auto vehicle is turned so as to bring the steering wheels into an angular position, the transverse movement of the clamp 28 and pin 26 tilts the lever 10 and arms 11 and 12, causing the outer end of one of said arms to fulcrum against the plate 8 by means of the outermost pin 13 which bears against the walls of one of the slots 15. In this manner the springs 24 and 25 are stretched, which would ordinarily increase the resistance to the steering movement. But this is offset by the fact that when the tilting movement of the lever 10 takes place the straight line formed by the springs 24 and 25 and the respective arms of the loop 21 approaches the fulcrum, shortening the distance between said fulcrum and said straight line and decreasing the mechanical advantage of the lever 10 so that the springs exert the same centering force upon the connecting rod 6 as when the stabilizing device is in its normal intermediate position. While it is essential that the pull of said springs be sufficient to hold the steering wheels to a straight course when it is desired to travel rectilinearly, even though the hands be temporarily removed from the steering wheel, yet, at the same time it is of great advantage to be able to steer around a curve without the handicap of the progressively increasing resistance of the stabilizing means.

Since the clamp 28 and the lever 10 are interconnected by means of a pin and slot joint, the arcuate movement of the end of the lever 10 in performing its oscillatory movements has no effect in "springing" the connecting rod 6 outwardly, a defect present in most other devices of like character, the clamp 28 being free to move laterally with the connecting rod independently of the lever 10. The roller 27 affords an anti-friction contact between the lever 10 and clamp 28 when these parts are relatively moved.

It will be observed that I have furnished the arms 11 and 12 with a plurality of fulcrum pins 13 at their outer ends and that I have formed a corresponding number of slots or notches 14 and 15 in the plate 8. The purpose of this duplication of elements is merely to distribute the strain, when the lever 10 is in a position at a right angle to the plate 8 and connecting rod 6, among a plurality of pins rather than concentrate it upon a single pin, it being well within the spirit of the invention however to provide but a single pin and slot for each of the arms 11 and 12'.

While I have herein shown and described what I believe to be a practical and preferred embodiment of my invention, yet it is to be understood that the precise details of construction shown are not to be considered limitative in their effect upon the invention except in so far as they may be prescribed by the express terms of the appended claims.

Having described my invention what I claim as new and desire to secure by Letters Patent, is:—

1. A stabilizer for vehicle steering wheels of the type wherein the wheels are connected for synchronous movement by a connecting rod which is longitudinally movable transversely of the vehicle, said stabilizer comprising a supporting plate for rigid attachment to the chassis of the vehicle rearwardly of the connecting rod, a centering lever having a vertical slot at its forward end, a pin working in said slot and having means for attachment to the connecting rod midway between the ends of the latter, a pair of arms extending, respectively, from the opposite side edges of said lever adjacent the rear end of the latter and bearing against the forward edge of said supporting plate, a bail mounted in and bearing against the rear wall of said slot and having its ends extending substantially parallel to one another above and below said lever, and a pair of springs, one below and the other above said lever, each of said springs having one of its ends connected under tension to said supporting plate midway between the ends of the latter and its opposite end connected to one end of said bail.

2. A stabilizer for vehicle steering wheels of that type which is connected for synchronous movement by a transversely movable connecting rod, including a fixed supporting plate, a centering lever having a channelled angularly disposed base embracing an edge of said supporting plate, means co-acting with said lever adapted to be secured to said connecting rod, and resilient means in tensioned engagement with said lever and supporting plate and extending transversely of the base of said lever above and below said plate for maintaining said lever in stable contact with said supporting plate and resisting lateral movement of said connecting rod, pins carried by said channelled base on opposite sides of and remote from the line of pull of said resilient means, about which said lever is tiltable in response to major movements of said connecting rod, for bringing said line of pull closer to said fulcra thereby offsetting the increase in resistance of said resilient means to lateral deviation of said lever.

3. A stabilizer for vehicle steering wheels of that type which is connected for synchronous movement by a transversely movable connecting rod, including a fixed supporting plate, a centering lever having a channelled angularly disposed base embracing an edge of said supporting plate, means co-acting with said lever adapted to be secured to said connecting rod, and resilient means in tensioned engagement with said lever and supporting plate extending across the base of said lever for maintaining said lever in stable contact with said supporting plate and resisting lateral movement of said connecting rod, pins carried by said channelled base on opposite sides of and remote from the line of pull of said resilient means, about which said lever is tiltable in response to major movements of said connecting rod, for bringing said line of pull closer to said fulcra thereby offsetting the increase in resistance of said resilient means to lateral deviation of said lever, and recesses in said supporting plate affording bearings for said pins.

4. A stabilizer for vehicle steering wheels of that type which is connected for synchronous movement by a transversely movable connecting rod, including a fixed supporting plate, a centering lever having an angularly disposed base resting upon said supporting plate, said lever being formed in its end remote from said base with a longitudinal slot in a vertical plane, means adapted to be secured to said connecting rod including a pin working in said slot, a member bearing against the end wall of said slot and having longitudinal extensions above and below said lever, springs extending across the base of said lever and secured under tension to said extensions and to said supporting plate for maintaining said lever in stable contact with said supporting plate and resisting lateral movement of said connecting rod, said lever being tiltable about a fulcrum in said base on either side of and remote from the line of pull of said resilient means in response to major movements of said connecting rod, for bringing the line of pull of said resilient means closer to said fulcra and thereby offsetting the increase in resistance of said springs to lateral deviation of said lever.

5. A stabilizer for vehicle steering wheels of that type which is connected for synchronous movement by a transversely movable connecting rod, including a supporting plate having means for securing it to the radius rods of the vehicle, a centering lever having an angularly disposed base resting against said supporting plate, said lever being constructed to straddle said supporting plate, the free end of said lever being formed with a longitudinal slot in a vertical plane, means co-acting with said lever and adapted to be secured to said connecting rod including a pin working in said slot, a member bearing against the end wall of said slot having longitudinal extensions above and below said lever, springs connected to said extensions and to said supporting plate in tensioned relation for maintaining said lever in stable contact with said supporting plate and resisting lateral movement of said connecting rod, said lever being tiltable about a fulcrum in said base on either side of and remote from the line of pull of said springs for bringing said line of pull closer to said fulcra and thereby lessening the resistance of said springs to lateral deviation of said lever.

6. A stabilizer for vehicle steering wheels of that type which is connected for synchronous movement by a transversely movable connecting rod, including a supporting plate having means for securing it to the radius rods of the vehicle, a centering lever having an angularly disposed base resting against said supporting plate, said lever being constructed to straddle said supporting plate, the free end of said lever being formed with a longitudinal slot in a vertical plane, means co-acting with said lever adapted to be clamped to said connecting rod, including a pin surrounded by an anti-friction roller, working in said slot, a member bearing against the end wall of said slot having longitudinal extensions above and below said lever, springs connected to said extensions and to said supporting plate in tensioned relation for maintaining said lever in stable contact with said supporting plate and resisting lateral movement of said connecting rod, said lever being tiltable about a fulcrum in said base on either side of and remote from the line of pull of said springs for bringing said line of pull closer to said fulcra and thereby lessening the resistance of said springs to lateral deviation of said lever.

In testimony whereof I have hereunto set my hand.

WALLACE T. WRIGHT.